US012601468B2

(12) United States Patent
Isaac

(10) Patent No.: US 12,601,468 B2
(45) Date of Patent: Apr. 14, 2026

(54) FLEXIBLE TRIM DEVICE FOR ENHANCING LED STRIP LIGHTS

(71) Applicant: Maxim Isaac, Windsor (CA)

(72) Inventor: Maxim Isaac, Windsor (CA)

( * ) Notice: Subject to any disclaimer, the term of this patent is extended or adjusted under 35 U.S.C. 154(b) by 0 days.

(21) Appl. No.: 18/363,490

(22) Filed: Aug. 1, 2023

(65) Prior Publication Data

US 2025/0043942 A1 Feb. 6, 2025

(51) Int. Cl.

*F21V 21/08* (2006.01)
*F21V 7/00* (2006.01)
*F21Y 103/10* (2016.01)
*F21Y 115/10* (2016.01)

(52) U.S. Cl.

CPC ........ *F21V 21/0808* (2013.01); *F21V 7/0008* (2013.01); *F21Y 2103/10* (2016.08); *F21Y 2115/10* (2016.08)

(58) Field of Classification Search

CPC ............... F21V 21/0808; F21V 7/0008; F21Y 2103/10; F21Y 2115/10
See application file for complete search history.

(56) References Cited

U.S. PATENT DOCUMENTS 11,313,524 B2 * 4/2022 Bianchi ................... F21V 7/005
2003/0014931 A1 * 1/2003 Hahn .................. E04F 19/0436 52/831
2005/0225982 A1 * 10/2005 Hahn .................... F21V 7/0016 362/249.16
2016/0341377 A1 * 11/2016 Eddins .................. F21V 21/005
2020/0109828 A1 * 4/2020 Tolen .................... F21V 15/012
2022/0061433 A1 * 3/2022 Bajovic .............. A41D 13/1192
2024/0019091 A1 * 1/2024 Van De Sluis ......... F21V 5/046

FOREIGN PATENT DOCUMENTS

CN 106677492 A * 5/2017 ........... B44C 5/0453

* cited by examiner

*Primary Examiner* — Christopher E Dunay

(57) ABSTRACT

The present invention is a trim device designed to enhance LED strip lights. The trim device is molded into various cross-sectional shapes and comprises an open or a translucent/opaque additional side. It is made of a flexible material, such as rubber or silicone, and features an outer section for attachment to surfaces. The trim accessory device effectively houses and conceals LED strip lights while allowing light to escape and reflect onto adjacent surfaces, resulting in a visually pleasing and evenly dispersed glow. Its sleek and unobtrusive design makes it suitable for various indoor and outdoor lighting installations, architectural accents, and decorative lighting arrangements. The trim device is easily customizable, simple to install, and capable of housing LED strip lights of various sizes and configurations. By diffusing direct glare and accentuating the LED glow, it adds elegance and functionality to LED strip light installations while maintaining a visually appealing ambiance.

9 Claims, 3 Drawing Sheets

FLEXIBLE TRIM DEVICE FOR ENHANCING LED STRIP LIGHTS

CROSS-REFERENCE TO RELATED APPLICATIONS

This application claims priority from the U.S. provisional patent application Ser. No. 63/359,870, filed on Jul. 10, 2022, which is incorporated herein by reference in its entirety.

FIELD OF THE INVENTION

The present invention pertains to the field of lighting accessories and, more specifically, an all-in-one piece compact flexible trim or molding device designed and engineered to house, conceal, and enhance the appearance of LED strip lights, rope lights, or tape lights. The invention focuses on providing a practical and aesthetically pleasing solution for hiding LED strip lights while effectively diffusing the direct glare emitted by the LED individual dots and lines. The invention finds application in various indoor and outdoor lighting installations, architectural accents, and decorative lighting arrangements in residential, commercial, and hospitality settings.

BACKGROUND

In recent years, LED strip lights have gained popularity as a versatile lighting solution for various applications, ranging from architectural accents to decorative lighting arrangements. While LED strip lights offer flexibility and energy efficiency, the exposed fixtures and the direct glare emitted by the LED dots and lines present challenges in achieving an optimal lighting effect. Current solutions for concealing LED strip lights and diffusing glare often involve complex multi-part systems or rigid trim pieces, which may be cumbersome to install and lack the desired aesthetic appeal. These existing options lack the simplicity, flexibility, and all-in-one design provided by the present invention. Additionally, some LED strip models come fully encased in rubber or silicone material for glare diffusion, but these are not accessories designed to conceal LED strips. DIY solutions involving the use of wood or plastic trim require extensive labor, specialized tools, and customization for proper fitting.

Furthermore, the exposed use of LED strip lights is not a complete or finished installation aesthetically. Incorporating LED strips in proper placements and applications, such as housing within bulkheads and covings, is not feasible for most users of LED strip lights since most spaces and rooms do not have built-in bulkheads and covings for LED strip lights to be inserted within to achieve a desirable glow effect.

To address these limitations, there is a need for a practical and aesthetically pleasing solution that effectively houses and conceals LED strip lights while enhancing their glow and diffusing the glare, without the need to construct bulkheads or covings. Such a solution should be easy to install, adaptable to different installation requirements, and capable of seamlessly blending into various environments.

The present invention aims to fulfill this need by introducing a novel trim device specifically designed to house, conceal, and enhance the appearance of LED strip lights. By combining functionality and elegance, this trim device revolutionizes the way LED strip lights are showcased, offering a streamlined and visually pleasing lighting solution for residential, commercial, and hospitality settings. It provides the utility of housing and concealing the LED strip lights and allowing for a beautiful glow effect without the need to build bulkheads or covings, saving time, money, and effort.

SUMMARY OF THE INVENTION

The disclosed invention, called the Lighting Trim Device, presents an innovative all-in-one piece solution designed to hide the direct glare and create a beautiful consistent glow for LED strip lights. The trim device serves as an accessory that complements and accentuates the installation of LED strip lights. Its specific design effectively houses and conceals the LED light strip while projecting the light onto adjacent surfaces, resulting in a visually appealing and evenly dispersed glow. The trim device's slim and stylish profile adds a touch of elegance to any space, whether the lights are on or off.

The Lighting Trim Device offers numerous benefits and features, distinguish it vastly from other known devices and solutions. With its all inclusive comprehensive design, no additional materials are required for installation. Its one-piece construction eliminates the need for joining multiple pieces, simplifying installation and setup. Requiring only a few tools, a pair of scissors to make necessary cuts, a tape measure for precise sizing, and, potentially, a ladder for higher installations.

The trim encompasses various embodiments, including L, V, U, C, triangle, square, or similar cross-sectional shapes, each tailored to accommodate LED strip lights, unique design includes one open side or a translucent/opaque side that allows the light to escape and reflect onto adjacent surfaces, providing a consistent and evenly dispersed glow. The trim design can accommodate LED strip/rope/tape lights of any size.

The trim is made of a continuous, flexible rubber or silicone material allowing it to bend and curve, conforming to any desired shape or pattern install. Its compact design enables it to be rolled or bundled into a space-saving reel for packaging, storing, and delivery.

The trim device incorporates a built-in adhesive that securely mounts onto almost any surface, eliminating the need for additional fasteners. The installation process is quick and straightforward, simply peel and stick the trim device in the desired location, with the side including the adhesive onto the surface, pressing firmly for ensuring a reliable bond. Once installed, the LED strip lights can be easily inserted through the open slot running along the entire length of the trim device. When the lights are turned on, the trim device effectively hides the direct glare emitted by the LED dots and lines, diffusing the light and creating a pleasant and consistent glow.

In addition to its functional benefits, the Lighting Trim Device adds a stylish finishing touch to LED strip light installations. Its sleek and unobtrusive design ensures that the focus remains on the lighting effect rather than the visible fixtures. Whether used in residential, commercial, or hospitality settings, the Lighting Trim Device enhances the overall aesthetics and ambiance.

BRIEF DESCRIPTION OF THE DRAWINGS

The invention is further described in conjunction with the accompanying drawings, wherein: The reference characters (1, 2, 3, 4, 5, 6, 7, and 8) used in the drawings correspond to the same specific features of the trim device for all figures and embodiments of the invention as summarized: (1)

Exterior shell, (2) Adhesive strip, (3) Rear side of the trim device, (4) Interior hollow core, (5) Platform for LED strip light, (6) LED strip light display, (7) Open slot for LED strip, and (8) Additional translucent/opaque side. Further details on these reference characters are provided in the detailed description section.

DETAILED DESCRIPTION

Figure 1A:
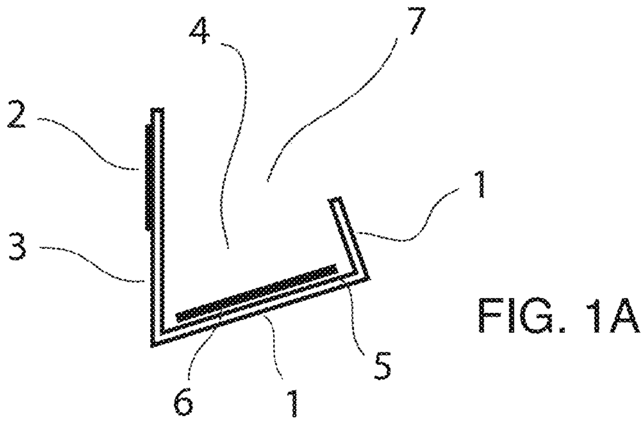
FIGS. 1A-1C are two-dimensional cross-sectional illustrations showcasing different variations and embodiments of the trim device design. The figures display the L, V, U, C, triangle, and square shapes of the trim device and highlight seven key details.

In the following detailed description, specific embodiments of the present invention are described to provide a thorough understanding of the disclosure. However, it will be apparent to one skilled in the art that the disclosed embodiments may be practiced without these specific details. Well-known structures and functions have not been shown or described in detail to avoid unnecessarily obscuring the embodiments of the invention.

The Lighting Trim Device, as disclosed herein, is a revolutionary solution designed to house and conceal LED strip lights while enhancing their visual impact and diffusing glare. The trim device is formed from a flexible rubber, silicone, foam, or similar material, which allows it to be easily manipulated and installed in various settings.

In the illustrations provided in the drawings section, reference characters 1, 2, 3, 4, 5, 6, 7, and 8 are used to denote specific features of the trim device design. These reference characters are listed below as "detail" followed by the corresponding number. The details provided in the drawings align with the descriptions outlined.

Figure 1B:
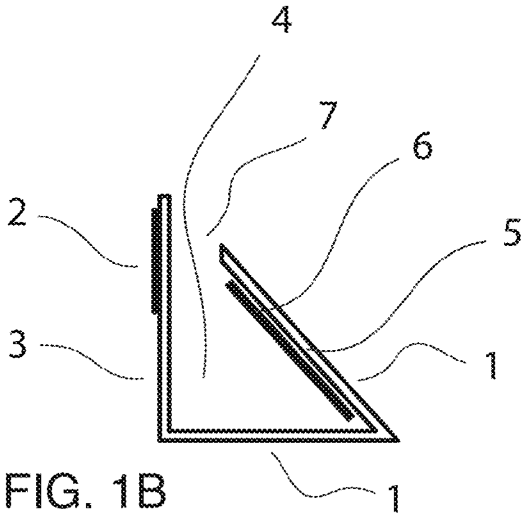
Figure 1C:
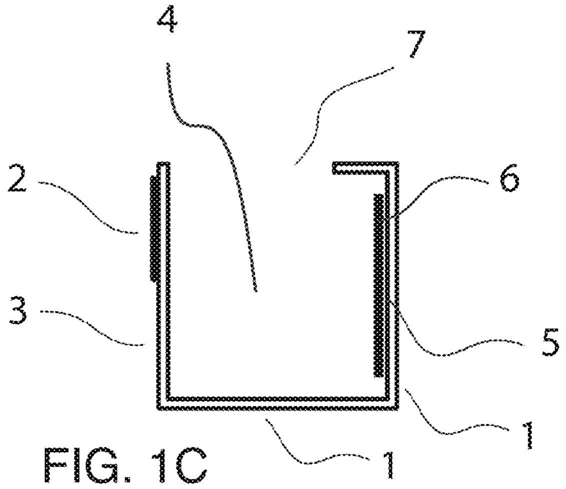

FIGS. 1A-1C are cross sections of different variations of the trim design. Each figure represents a two-dimensional illustration showing the variances of the L, V, U, C, triangle, square shapes within the trim device. These figures are referenced by the following detail numbers.

Detail 1 of FIGS. 1A-1C refers to the outside/exterior sides of the trim device that will be most visible once installed. Although the cross sections of the trim device differ in shape, they all share the same detail of being the exterior shell that conceals the LED strip on the inside.

Detail 2 of FIGS. 1A-1C refers to the adhesive strip located on the rear side of the exterior of the trim device. This adhesive strip is built into the trim device and comes with a protective film that can be peeled off before mounting the trim device to almost any surface.

Detail 3 of FIGS. 1A-1C refers to one of the exterior sides of the trim device, which can be considered the rear side of the trim device. This side gets placed on the surface and is also the same side where the adhesive strip is located.

Detail 4 of FIGS. 1A-1C refers to the inside/interior shape of the trim device for all three figures, it forms the hollow core of the trim device, housing and concealing the LED strip light. This hollow core of the trim device is not generally exposed to the user once installed and serves to house and conceal the LED strip light.

Detail 5 of FIGS. 1A-1C refers to one of the interior sides of the hollow core of the trim device. This side provides a platform on which the LED strip light is placed and rests.

Detail 6 of FIGS. 1A-1C refers to the LED strip light shown in these drawings for demonstration purposes only. It showcases the utility of the lighting trim device, although the LED strip light is not a direct accompanying part of the device invention.

Detail 7 of FIGS. 1A-1C refers to the open slot that allows the LED strip to be inserted through and allows the light to escape from the inside of the trim device to reflect onto adjacent surfaces.

Figure 2:
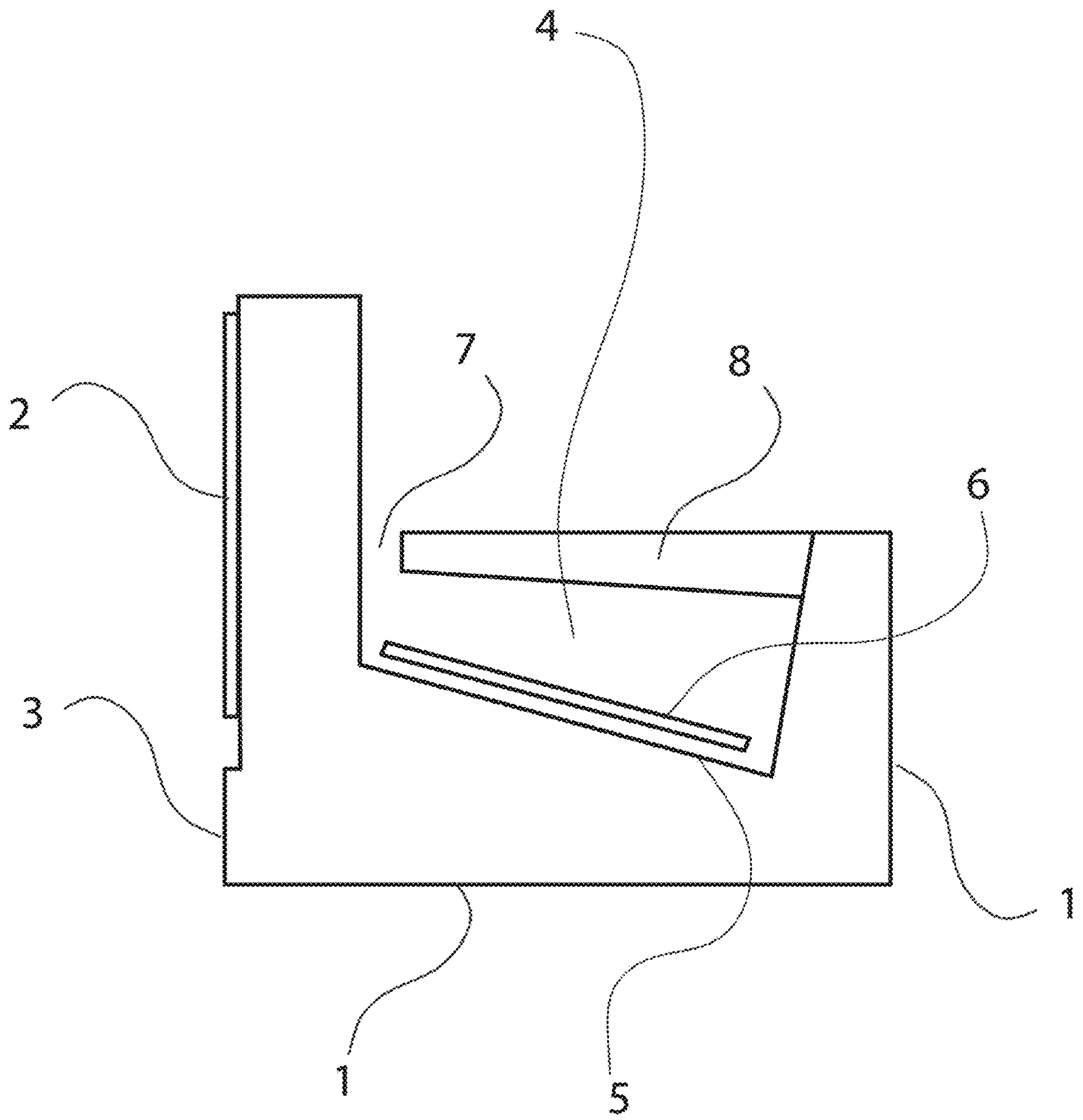
FIG. 2 is a two-dimensional cross-sectional illustration presenting a mixed embodiment of the trim device design as presented in FIGS. 1A-1C, with an additional translucent/opaque side replacing the open side. This figure demonstrates the functionality of the trim device and features eight key details.
Figure 3A:
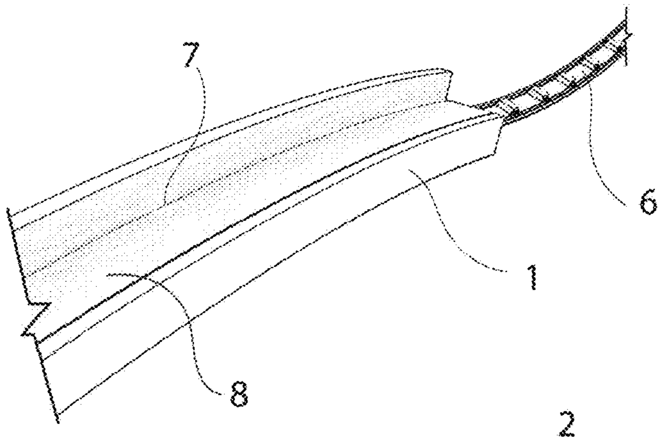
FIGS. 3A-3E are three-dimensional angled perspective views of the cross-sectional design of FIG. 2. These figures demonstrate the housing and concealment of the LED strips and share the same eight key details.
Figure 3B:
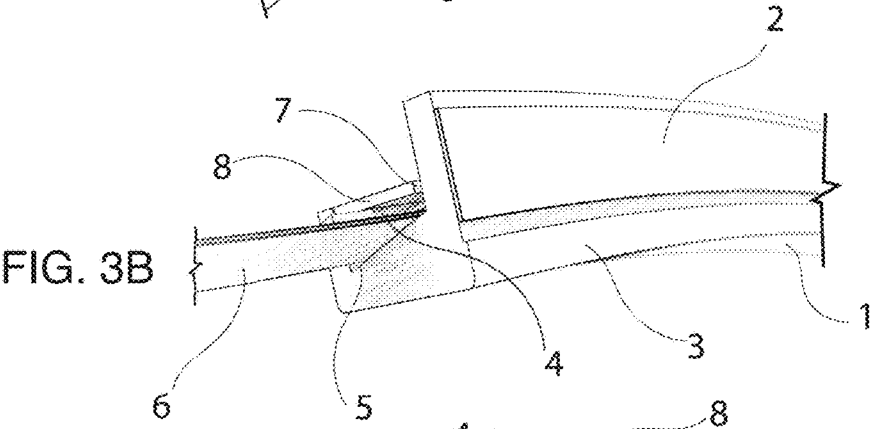
Figure 3C:
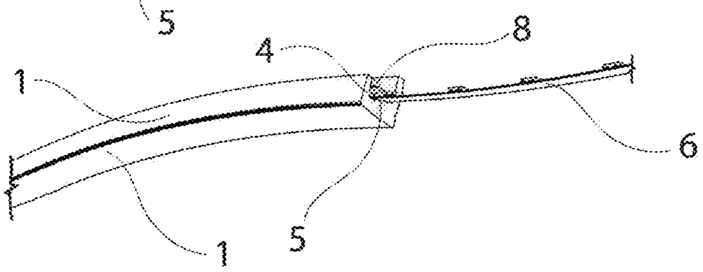
Figure 3D:
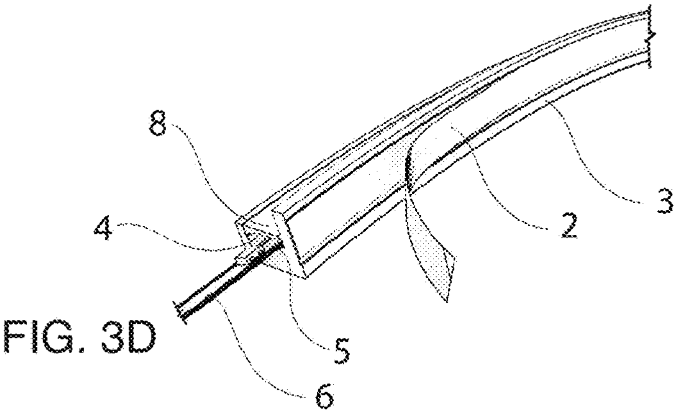
Figure 3E:
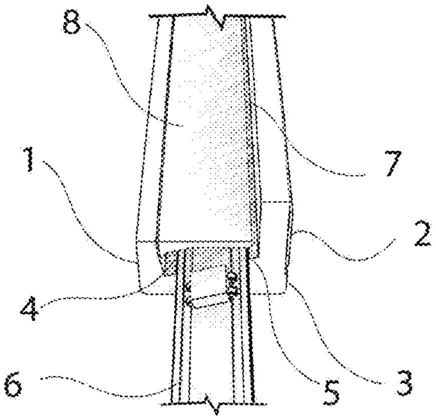

FIG. 2 represents a cross section of a different variation of the trim device design. This figure is a two-dimensional illustration showing a mixed embodiment of a U, C, square-shaped cross section. The variation in this design compared to the previous figures is as follows:

Detail 1 of FIG. 2 refers to the outside/exterior sides of the trim device that will be most visible once installed.

Detail 2 of FIG. 2 refers to the adhesive strip located on the rear side of the exterior of the trim device. This adhesive strip is built into the trim device and comes with a protective film that can be peeled off before mounting the trim device to almost any surface.

Detail 3 of FIG. 2 refers to one of the exterior sides of the trim device, which can be considered the rear side of the trim device. This side gets placed on the surface and is also the same side where the adhesive strip is located.

Detail 4 of FIG. 2 refers to the inside/interior shape of the trim device, it forms the hollow core of the trim device, housing and concealing the LED strip light.

Detail 5 of FIG. 2 refers to one of the interior sides of the hollow core of the trim device. This side serves as the platform on which the LED strip light is placed and rests.

Detail 6 of FIG. 2 refers to the LED strip light shown in this drawing for demonstration purposes only. It showcases the utility of the lighting trim device, although the LED strip light is not a direct accompanying part of the device invention.

Detail 7 of FIG. 2 refers to the open slot that allows the LED strip to be inserted or removed through. The flexibility of the trim device's material allows for a wider opening when pressure is applied, and it regains its shape once the pressure is released.

Detail 8 of FIG. 2 refers to the additional side addition to the trim device design. This side is made of the same flexible material as the rest of the trim device but has a translucent/opaque appearance. It allows light to escape from the inside of the trim device and reflect onto adjacent surfaces, enhancing the overall lighting effect.

FIGS. 3A-3E represent different three-dimensional angle views of the same cross-sectional design of FIG. 2. They demonstrate the housing and concealment of the LED strip lights. The details in these figures are the same as those describing FIG. 2, corresponding to the respective detail numbers.

By incorporating these detailed drawings and descriptions, the Lighting Trim Device offers a comprehensive solution for concealing and enhancing the appearance of LED strip lights. The combination of its innovative design, flexible material, and easy installation process make it a versatile and aesthetically pleasing accessory for various indoor and outdoor lighting installations.

The invention claimed is:

1. A lighting trim device, an accessory item for LED strip lights, comprising:

a flexible rubber, silicone, or foam material molded into a single all-in-one piece construction having an L, V, U, C, triangle, or square-cross-sectional shape of multiple sides;

a hollow inner section along the length of the trim device, designed to house and conceal the LED strip lights;

an open side or translucent/opaque side along the length allowing light to escape from the inner section and reflect onto mounting surfaces adjacent to the installed trim device;

an outer side along the length for attaching to surfaces; and an open slot formed along the entire length of one side of the trim that allows the LED strip to be inserted through.

2. The lighting trim device of claim 1, wherein the flexible material is rubber or silicone, which can be bent and flexed to be shaped and molded.

3. The lighting trim device of claim 1, comprising an integrated adhesive layer applied to the outer section of the trim device for securing the trim device to surfaces.

4. The lighting trim device of claim 1, wherein the trim device is easily customizable for specific custom fit installations, and can be cut with regular scissors, and joined together to fit specific installation requirements.

5. The lighting trim device of claim 1, wherein the trim device is rollable or bundlable into a compact form for efficient packaging, storage, and transportation.

6. The lighting trim device of claim 1, wherein the trim device provides a diffusion effect resulting in a consistent and evenly dispersed and accentuated glow of the LED strip lights.

7. The lighting trim device of claim 1, wherein the trim device is suitable for various indoor and outdoor lighting installations, architectural accents, and decorative lighting arrangements in residential, commercial, and hospitality settings.

8. The lighting trim device of claim 1, wherein the trim device is capable of concealing and compatible LED strip lights of various sizes, types, and configurations.

9. The lighting trim device of claim 1, wherein the trim device is easily installable by peeling off the plastic film from the built in adhesive and pressing the side of the trim device with the adhesive layer to surfaces.

* * * * *